United States Patent [19]
Peddy

[11] 3,927,488
[45] Dec. 23, 1975

[54] DEVICE FOR PREVENTING TWISTS IN FISHING LINES

[76] Inventor: Aubrey R. Peddy, Rte. No. 1, Box 104, Groveland, Fla. 32736

[22] Filed: Mar. 17, 1975

[21] Appl. No.: 558,930

Related U.S. Application Data

[63] Continuation-in-part of Ser. No. 503,646, Sept. 6, 1974, abandoned.

[52] U.S. Cl. .................................................. 43/25
[51] Int. Cl.²........................................ A01K 87/00
[58] Field of Search .............. 43/25, 25.2, 24, 43.13

[56] References Cited
UNITED STATES PATENTS

| | | | |
|---|---|---|---|
| 3,113,363 | 12/1963 | Fyvie | 43/25 |
| 3,256,633 | 6/1966 | Smith | 43/25 |
| 3,545,119 | 12/1970 | Murnan | 43/25 |

FOREIGN PATENTS OR APPLICATIONS

| | | | |
|---|---|---|---|
| 1,346,882 | 11/1963 | France | 43/25 |

*Primary Examiner*—Warner H. Camp
*Attorney, Agent, or Firm*—Duckworth, Hobby & Allen

[57] ABSTRACT

A device combined with a fishing rod and reel for preventing twists in fishing lines, the device comprising a member having a substantially V-shaped opening extending therethrough, said V-shaped opening tapering toward the central portion of the member and including a slot communicating with the opening. A shaft is provided to couple the member to the fishing rod at a point intermediate between the reel and the extremity of the rod so that fishing line can extend from the reel through the V-shaped opening of the member to the extremity of the rod.

6 Claims, 2 Drawing Figures

DEVICE FOR PREVENTING TWISTS IN FISHING LINES

This application is a continuation-in-part of application Ser. No. 503,646 filed September 6, 1974, and now abandoned.

BACKGROUND OF THE INVENTION

1. Field of the Invention

The present invention relates to devices used in combination with appartus for dispensing and/or reeling a line, and in particular is useful for fishing rods and reels of the type employing monofilament fishing line.

2. Description of the Prior Art

Monofilament material is frequently used as fishing line. However, this material has a tendency to twist, which becomes a serious problem in a certain type of reel known as a "closed face" reel, since the tangle or twist may occur inside the reel and may be difficult, if not impossible, to untwist.

There have been suggestions in the art for providing a device in combination with a fishing rod to allow the monofilament material to be straightened so as to avoid twists prior to entry into the reel. In U.S. Pat. No. 3,545,119, Murnan discloses a V-shaped device in which the center line of the V extends in a substantially upward direction so as to prevent twisting of the line.

In U.S. Pat. No. 2,700,787, Trapanese discloses a resilient disk having a slot adapted to receive fishing line, the disk serving the purpose of drying the fishing line as it enters the extremity of the rod. Lichtig, in U.S. Pat. No. 2, 650,448, discloses a fishing line brake having a slotted arrangement somewhat similar to that disclosed by Murnan.

SUMMARY OF THE INVENTION

The present invention contemplates the combination of apparatus of the type having a reel and a guideway for line extending substantially parallel to the guideway so as to dispense and/or take up the line, with means for preventing twists in the line during the dispensing and/or reeling operation. This twist preventing means comprises a member having an outer side and a V-shaped opening extending therethrough and tapered from a wide dimension adjacent the side to a narrow dimension at a central portion of the member. The member further includes a slot communicating with the narrow dimension of the V-shaped opening, the slot and the V-shaped opening extending at a direction substantially other than parallel to an imaginary plane extending through the line and the guideway. Means are provided for attaching the member to the guideway in spaced relationship thereto.

In a specific application of the present invention, the device is utilized with a fishing rod and reel combination so as to prevent twist in a fishing line extending from the reel to the extremity of the rod. In a preferred embodiment, the twist preventing means is rotated sideward with respect to an imaginery plane extending through the rod and through the position of the line if otherwise not extending through the twist preventing device.

THE DRAWING

DETAILED DESCRIPTION

Figure 1:
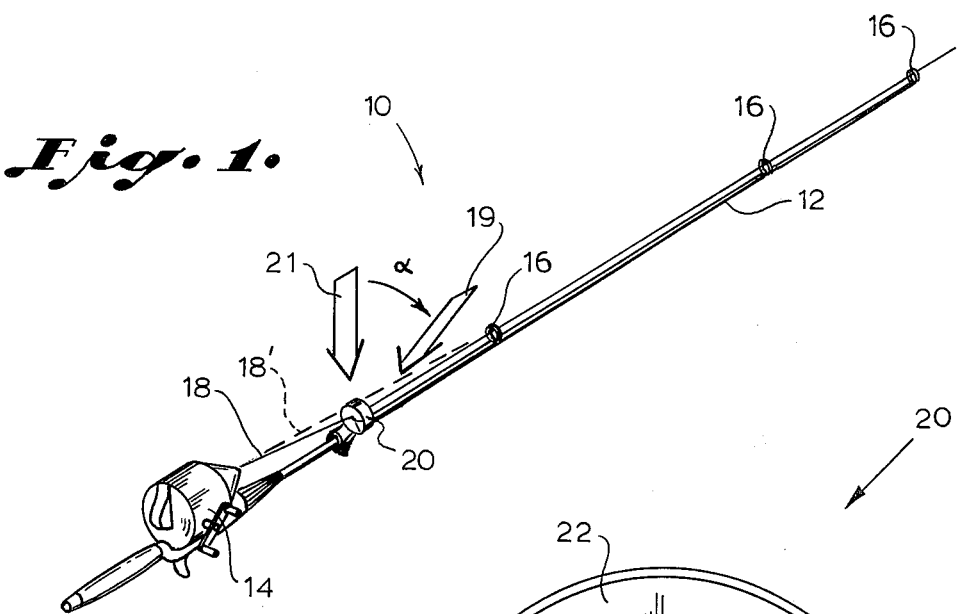
FIG. 1 is a perspective view illustrating the manner in which the twist preventing device of the present invention is combined with a fishing rod and reel arrangement.
Figure 2:
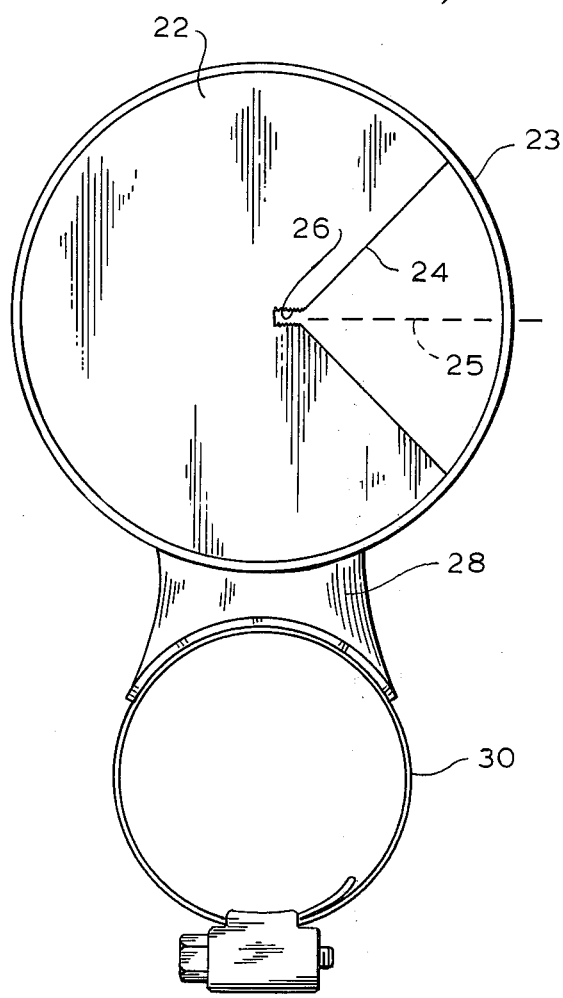
FIG. 2 is a front plan view of the twist preventing device illustrated in FIG. 1.

The present invention will be desribed with reference to FIGS. 1 and 2.

Noting FIG. 1, the rod and reel and twist preventing device combination is referred to generally as 10. This combination includes a fishing rod 12 and a reel 14 affixed to the rod in the normal manner, the rod having guides 16 positioned along the rod so as to guide a fishing line 18 extending from the reel 14 to the extremity of the rod 12.

In accordance with the present invention, a twist preventing device 20 is provided, this device being described in greater detail below with reference to FIG. 2. With continued reference to FIG. 1, there is shown two imaginary planes 19 and 21, both illustrated as flat arrows. A first one of these imaginary planes 21 is defined as the imaginary plane extending through the rod and the position of the line if the line were not extending through the twist preventing device 20; this line position is shown by a dotted line identified as 18' in FIG. 1. The second of the two imaginary planes is defined as the plane extending through the reel and the line 18, as the line 18 actually extends through the twist preventing device 20.

As is clearly shown in FIG. 1, an angle alpha ($\alpha$) is defined indicating that the twist preventing device 20 is rotated sideward with respect to the imaginary plane 21, such that the angle alpha is defined between the two imaginary planes 21 and 19. Preferably, this angle alpha is between 10 and 40 degrees; although any angle which is other than substantially parallel with the imaginary plane 21 is suitable for purposes of the present invention.

Reference is now made to FIG. 2. The twist preventing device 20 includes a cylindrical block 22 having a continuous side 23 associated therewith. The device 20 further includes a V-shaped opening 24 having a center line 25, the V-shaped opening 24 having a wide dimension adjacent a portion of the continuous side 23 and a tapering to a narrow dimension at a central portion of the cylindrical block 22. A narrow slot 26 communicates with the narrow dimension of the Vshaped opening 24, the slot 26 being defined by roughened surfaces extending substantially parallel with the center line 25 of the V-shaped opening 24.

A shaft 28 is provided extending substantially normal to the continuous side 23, and having a fastener 30 attached to the shaft so as to affect joinder of the device 20 to the fishing rod in the manner shown in FIG. 1. Alternatively, the device 20 may be mounted to the rod by means of glue, clamps or wrapped with thread in a manner commonly used in attaching the guides 16 to fishing rods.

The cylindrical member 22 may comprise a one-half thick neoprene block or similar friction material, with the V-shaped opening 24 and center slot 26 cut therefrom. Preferably, the device 20 is mounted on a fishing rod about four inches from the exit of the line 18 from the reel 14, and is canted sideward such that the angle alpha is preferably about twenty degrees. The line 18 is threaded through the V-shaped opening and then through the guides 16 of the rod.

In use, when the angler makes a cast the line is free in the V-shaped opening 24 to move through the cylindrical member 22. When the angler makes the first turn of the crank associated with the reel 14, the line 18 automatically moves along the surfaces defining the V-shaped opening 24 and into the central slot 26. The roughened surfaces provide additional drag so as to straighten the line and prevent twisting thereof.

It will be understood by those skilled in the art that the member 22 may be shapes other than the cylindrical shape shown in FIG. 2, and that the V-shaped opening 24 may have inwardly or outwardly curved sides, rather than the straight sides depicted in FIG. 2.

I claim:

1. A fishing rod and reel combined with a device for preventing twist in fishing lines, said combination comprising:
   a member having an opening extending therethrough, said opening having a substantially V-shape and tapered toward a central portion of said member;
   said V-shaped opening in said member extending in a substantially sideward direction with respect to a plane defined by said fishing line and said rod;
   said member further including a central slot defined by roughened surfaces communicating with said V-shaped opening at said central portion thereof;
   means for attaching said member to said fishing rod at a point intermediate between said reel and the extremity of said rod with fishing line extending from said reel through said V-shaped opening of said member to the extremity of said rod, said attaching means comprises a shaft extending substantially perpendicular to the center line of said V-shaped opening; and wherein
   said fishing line moves across said surfaces of said member defining said V-shaped opening and into said slot when operation of said reel draws said fishing line taut.

2. The combination recited in claim 1 wherein said shaft further extends at an angle of between about 10°–40° with respect to an imaginary plane extending through said rod in the position of said line when not extending though said member.

3. The combination recited in claim 2 wherein said member has a continuous side.

4. The combination recited in claim 3 wherein said member has a substantially cylindrical shape.

5. The combination recited in claim 4 wherein said continuous side of said cylindrical member extends substantially parallel with a portion of said fishing line passing therethrough.

6. In combination with apparatus of the type having a reel and a guideway for a line extending substantially parallel with said guideway so as to dispense and/or take up said line, means for preventing twist in said line comprising:
   a member having an outer side and a V-shaped opening extending therethrough and tapered from a wide dimension adjacent said side to a narrow dimension at a central portion of said member;
   said member further including a slot having roughened surfaces communicating with said narrow dimension of said V-shaped opening, said slot and said V-shaped opening extending in a direction substantially other than parallel to an imaginery plane extending through said line and said guideway;
   means for attaching said member to said guideway in spaced relationship thereto, said attaching means comprising a shaft extending substantially perpendicular to the center line of said V-shaped opening; and wherein
   said fishing line moves through said V-shaped opening and into said slot when operation of said reel draws said fishing line taut.

* * * * *